May 10, 1932.  C. H. MONROE  1,857,319
VARIABLE PITCH PROPELLER
Filed Oct. 18, 1929   2 Sheets-Sheet 2
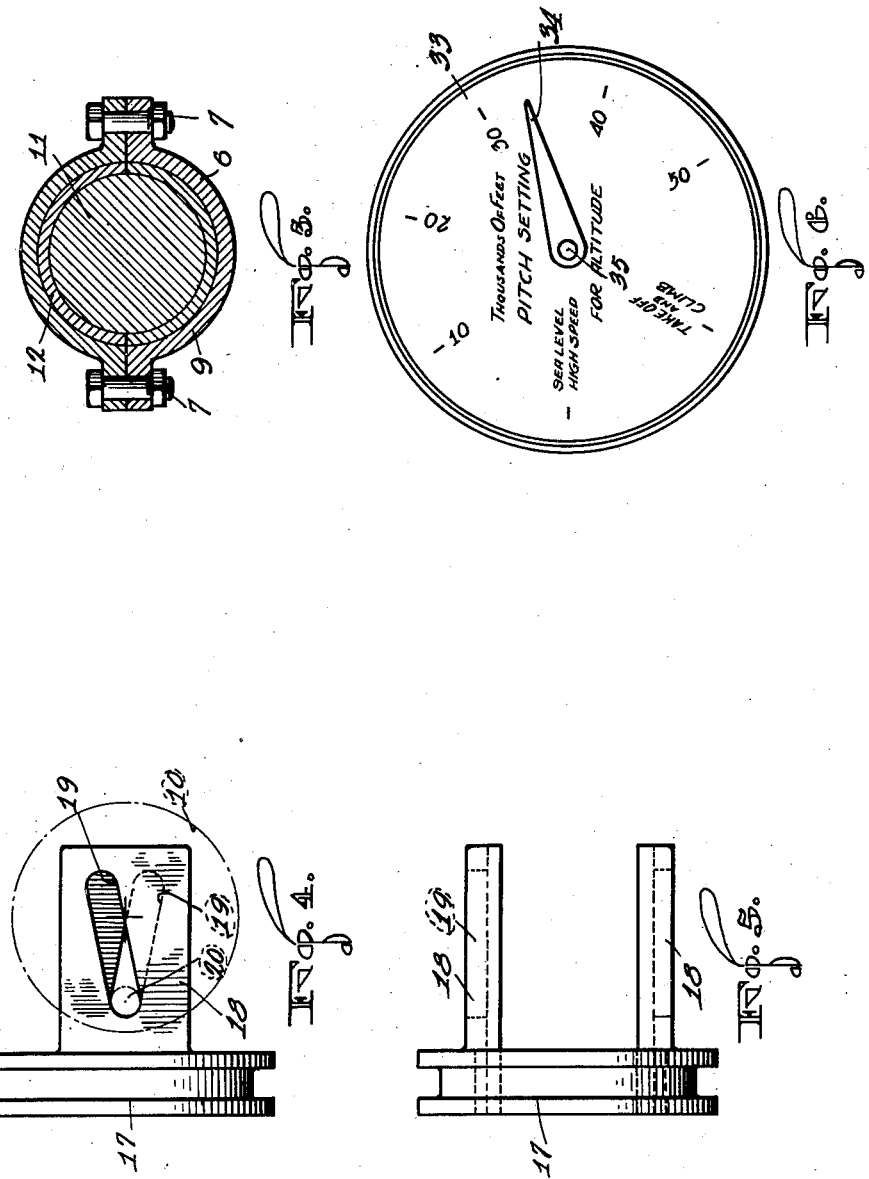
INVENTOR.
CHARLES H. MONROE
BY Munn & Co.
ATTORNEYS.

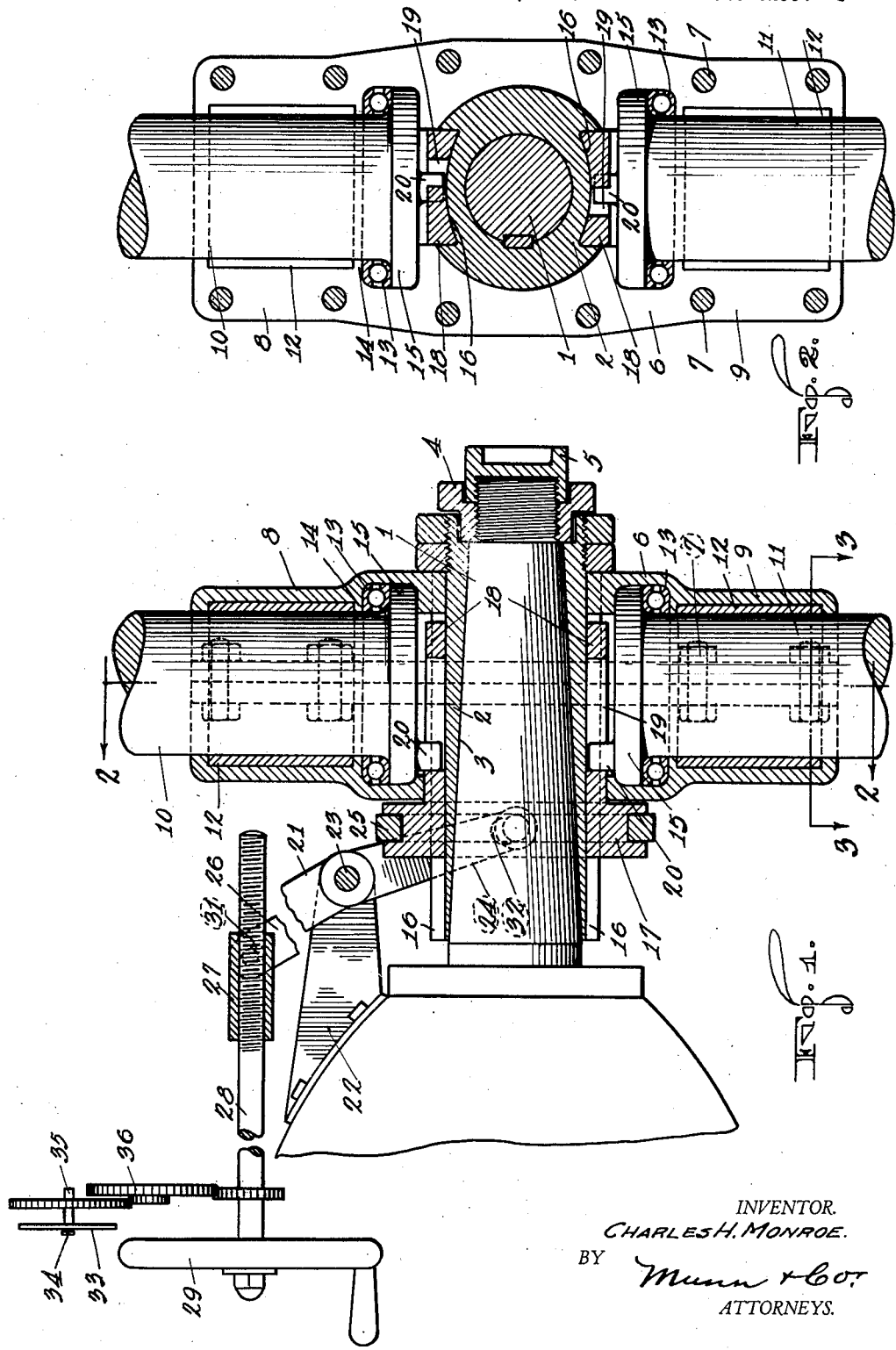

Patented May 10, 1932

1,857,319

UNITED STATES PATENT OFFICE

CHARLES H. MONROE, OF BERKELEY, CALIFORNIA

VARIABLE PITCH PROPELLER

Application filed October 18, 1929. Serial No. 400,640.

The present invention relates to improvements in variable pitch propellers intended to be used particularly for airplanes. It is a well known fact that for different altitudes propellers of different pitch are best adapted, and that for best results the pitch of the propeller blades should be changed as the airplane enters higher altitudes. While at sea level a slight pitch of the propeller blades is best adapted, for higher altitudes the pitch should be increased, that is, the angle of the propeller blades relative to the transverse plane extending through the propeller shaft should be enlarged so as to allow the propeller blades a better hold on the rarified air. In a similar manner a steeper pitch is desirable for starting the airplane from the ground surface, and climbing at a steep angle, since a steeper blade allows a heavier load to be pulled.

In the present invention it is proposed to provide a variable pitch propeller that allows of each adjustment of the pitch of the propeller blades while the airplane is in flight. A further object of the invention is to provide indicating means in combination with the variable pitch propeller which allows the pilot of the airplane to easily ascertain the proper pitch to be used for a certain altitude.

It is further proposed to provide an air screw of maximum pitch efficiency for different densities of atmosphere, different engine speeds and different angles of incidence of the plane.

It is further proposed to provide a variable pitch propeller in which the propeller blades may be reversed for retarding the landing speed of the plane.

It is further proposed in the present invention to provide a variable pitch propeller that is very rugged in construction and positive and simple in operation.

Further objects and advantages of my invention will appear as the specification proceeds.

The preferred form of my invention is illustrated in the accompanying drawings in which Figure 1 shows a vertical axial section through my variable pitch propeller with its adjusting mechanism, only the inner ends of the blades being shown, Figure 2 a transverse section taken along line 2—2 of Figure 1, Figure 3 a section taken along line 3—3 of Figure 1, Figure 4 a detail top plan view of an operating sleeve used in my invention, Figure 5 a side elevation of the same, and Figure 6 a front view of a dial used in connection with my variable pitch propeller.

While I have shown only the preferred form of my invention, I wish to have it understood that various changes or modifications may be made within the scope of the claims hereto attached without departing from the spirit of the invention.

My variable pitch propeller has been particularly developed for use in connection with the Wright whirl-wind motor which has a tapered propeller shaft 1 extending forwardly therefrom. In carrying out my invention, I fit a tube 2 having a cylindrical outer face and a tapered inner face as shown at 3 on the propeller shaft so as to provide a cylindrical surface. This tube is held in place by means of a nut 4 threaded on the end of the propeller shaft, and the latter is locked by means of a second nut 5. The tube 2 has a housing 6 fastened thereto, which latter preferably consists of two similar sections fastened together by means of bolts 7 and is formed to provide two radial hubs 8 and 9 extending in opposite directions and adapted to revolvably receive therein the inner ends of the two propeller blades 10 and 11. Ample bearing surface is provided for each propeller blade in a bronze bushing 12, and furthermore a flat plate ball thrust bearing 13 is provided between a shoulder 14 formed in the hub and a flange 15 at the inner end of each blade, this bearing being intended to take outward or centrifugal thrusts.

The tube 2 is formed with two longitudinal grooves 16, the grooves being arranged diametrically opposite one another and extending from the inner end of the tube into and through the housing 6. A sleeve 17 is slidable on the tube and is formed with two prongs 18 adapted to ride in the grooves 16.

These prongs, which extend into the housing, are formed with slots 19 arranged at opposite angles to longitudinal lines and adapted to receive therein lugs 20 extending eccentrically from the inner faces of the propeller blades 10 and 11. It will be noted that movement of the sleeve 17 along the shaft will cause the studs 20 to ride in the slots 19, whereby the two propeller blades are turned in opposite directions for changing the pitch or angularity of the blades.

The sleeve 17 is operated by means of a lever 21 pivoted to a fixed bracket 22 as shown at 23, having one arm 24 engaging a bronze collar or ball thrust bearing 25 surrounding the sleeve, while the other arm 26 is pivoted to a nut 27 threaded on a rod 28 held against endwise motion in any suitable manner, not shown in the drawings, the rod having a hand wheel 29 thereon. It should be noted that at both ends of the lever slots are provided as at 31 and 32 to allow of sufficient play to compensate for circumferential movement of the arms as compared with longitudinal movement of the nut and the sleeve.

In a convenient place for observation by the pilot, there is mounted a dial 33 shown in detail in Figure 6, the dial containing a scale including a number of figures referring to thousands of feet of altitude. A pointer 34 is revolvable over this scale and is fixed to a shaft 35, which latter is connected by a train of gears shown at 36 to the rod 28. The setting of the pointer relative to the variations in pitch is such that the pointer indicates on the dial the elevation for which the pitch used is best adapted, and an operator who is travelling at an elevation of 30,000 feet would move his hand wheel 29 until the pointer on his dial shows 30,000 feet.

The operation of the invention should be readily understood from the foregoing description. The sleeve 17 may be moved longitudinally on the tube 2 by operation of the hand wheel 29, and through the slots 19 and the lugs 20 the sleeve controls the pitch of the propeller blades. In the position shown in the drawings, the studs 20 are in the innermost ends of the slots 19, which means that the pitch of the propellers is the minimum pitch that can be used to advantage. To increase the pitch, the operator turns the wheel 29 for retracting the sleeve 17, whereupon both propeller blades are turned. It should be understood that, as indicated on the dial in Figure 6, for the take-off a comparatively steep pitch is to be preferred, while in ordinary flight at low elevations a comparatively slight pitch is used. As the airplane climbs to higher elevations, the pitch may be easily changed and the pilot may readily read from the dial the best pitch for the elevation the plane occupies at a given time.

I claim:

1. In a variable pitch propeller, a rotary member having radial hubs extending therefrom and formed with longitudinal grooves in the surface thereof, propeller blades rotatable in said hubs, a sleeve slidable on the member having prongs riding in the grooves with angular slots formed in the prongs and studs extending from the propeller blades into the slots.

2. In a variable pitch propeller, a rotary member having radial hubs extending therefrom and formed with longitudinal grooves in the surface thereof, propeller blades rotatable in said hubs, a sleeve slidable on the member having prongs riding in the grooves and coacting means on the prongs and the propeller blades for imparting rotary motion to the latter when the sleeve is advanced.

CHARLES H. MONROE.